United States Patent
Piepenstock

[11] Patent Number: 5,516,085
[45] Date of Patent: May 14, 1996

[54] HELICAL COMPRESSION SPRING

[76] Inventor: Friedhelm Piepenstock, Gewerbering 7, D-58579 Schalksmühle, Germany

[21] Appl. No.: 400,023

[22] Filed: Mar. 6, 1995

[30] Foreign Application Priority Data

Mar. 19, 1994 [DE] Germany .................. 44 09 443.4

[51] Int. Cl.[6] ............................................ F16F 1/06
[52] U.S. Cl. .................. 267/166; 267/148; 267/166.1
[58] Field of Search ..................... 267/148, 149, 267/153, 166, 166.1, 167, 170, 174, 180, 181; 5/256, 257, 476; 264/297.2

[56] References Cited

U.S. PATENT DOCUMENTS

| | | | |
|---|---|---|---|
| 2,087,354 | 4/1936 | Muffly | 267/181 |
| 2,678,685 | 5/1954 | Volsk | 267/181 |
| 2,852,424 | 9/1958 | Reinhart et al. | 267/149 |
| 3,081,992 | 3/1963 | Kessler | 267/148 |
| 4,017,062 | 4/1977 | Zwirner | 267/166 |
| 4,077,619 | 3/1978 | Borlinghaus | 267/166 |
| 4,260,143 | 4/1981 | Kliger | 267/166 |
| 4,544,610 | 10/1985 | Okamoto et al. | 267/149 |
| 4,858,897 | 8/1989 | Irifune | 267/181 |
| 4,895,352 | 1/1990 | Stumpf | 267/122 |
| 5,066,708 | 11/1991 | Koller et al. | 267/153 |
| 5,192,057 | 3/1993 | Wydra et al. | 267/153 |

FOREIGN PATENT DOCUMENTS

| | | |
|---|---|---|
| 1109463 | 6/1961 | Germany . |
| 1941529 | 6/1966 | Germany . |
| 1942371 | 7/1966 | Germany . |

*Primary Examiner*—Robert J. Oberleitner
*Assistant Examiner*—Chus Schwartz
*Attorney, Agent, or Firm*—Edwin D. Schindler

[57] ABSTRACT

A helical compression spring which has at both ends terminal rings with the diameter of the flight and is designed as a plastics injection molding. The technical problem is to provide corrosion-resistant and lightweight helical compression springs which are suitable for automatic fitting. The terminal rings of helical compression springs arranged side by side are materially interconnected by bridges to form as strip.

5 Claims, 1 Drawing Sheet

HELICAL COMPRESSION SPRING

DESCRIPTION

The invention relates to a helical compression spring.

Helical compression springs made of plastic are known from German Utility Model 19 41 529 and German Utility Model 19 42 371. These helical compression springs are lightweight and therefore not suitable for automatic manipulation. Particularly in feeding apparatus, such lightweight parts can scarcely be handled.

The object of the invention is to provide corrosion-resistant and lightweight helical compression springs which are suitable for automatic fitting.

This object is achieved according to the invention in that the terminal rings (2) of helical compression springs (1) arranged side by side are materially interconnected by bridges (3) to form a strip (3).

The invention differs from the prior art insofar as a plurality of helical compression springs form a strip which has a good cohesion. This strip can easily be handled and fed, so that the helical compression springs can be separated immediately before fitting. The strip can be manipulated in an assembly machine. Individual alignment and individual feeding of the individual helical compression springs is dispensed with. As a result, the handleability is considerably improved. The helical compression springs are not separated until immediately before positionally correct fitting in the assembly machine. This strip may also be manufactured as an endless strip with the aid of a cyclically working injection mold, as a result of which further rationalization effects can be obtained.

An optimal design of the helical compression springs is achieved in that the helical compression springs (1) are arranged within the strip with their axes perpendicular to the strip longitudinal direction and parallel to one another.

A thermoplastic or an elastomer is suitable as the plastic.

A particularly high stiffness of the helical compression spring is achieved in that the flight (1) lies against a continuous axial shaft (4). The helical compression spring is thus designed in the manner of a corkscrew.

The helical compression spring allows optimal adaptation to any desired spring characteristic inasmuch as the helical compression spring has portions of different spring stiffness in the axial direction. The design as an injection molding permits adaptation to any desired characteristics through dimensional change.

Adaptation is obtained in a simple way in that the cross section and/or the lead of the flights are designed differently in the axial direction of the helical compression spring.

A soft characteristic in the end regions and a hard characteristic in the middle region is achieved in that the helical compression spring has a smaller cross section in the end regions and a larger cross section in the middle region of the flights. This is particularly advantageous in the case of nonreturn valves since the soft characteristic of the end regions ensures quick closure of the nonreturn valve.

Exemplary embodiments of the invention are explained with reference to the drawing, in which.

Figure 1:
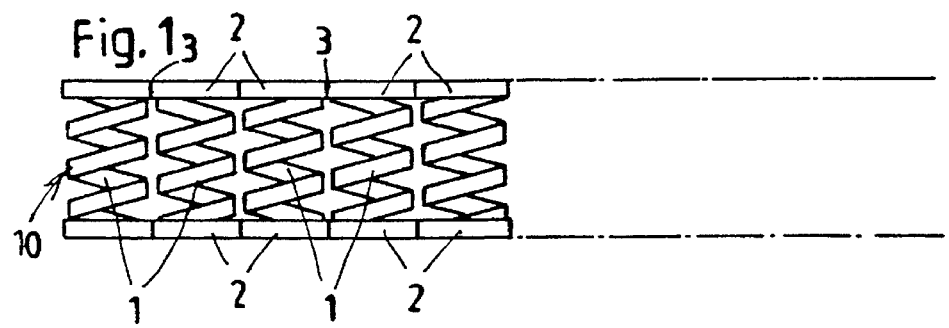
FIG. 1 represents an arrangement of helical compression springs as a strip.

FIG. 1 represents a plurality of single-start helical compression springs 10 arranged side by side with their axes parallel. The helical compression springs 10 have at both ends terminal rings 2 into which the respective flight 1 runs. The flight 1 can also a multiple helical thread, i.e., comprised of one or more helical threads. Adjacent terminal rings 2 are interconnected by bridges 3, so that an arrangement in the form of a strip of helical compression springs 1 is produced.

The helical compression springs are designed as plastics injection moldings made of a thermoplastic or an elastomer. The arrangement as a strip is particularly expedient for automatic feed of the helical compression springs in an assembly machine.

The strip may comprise a given number of helical compression springs. The strip may also be endless. This depends on the injection mold used.

Figure 2:
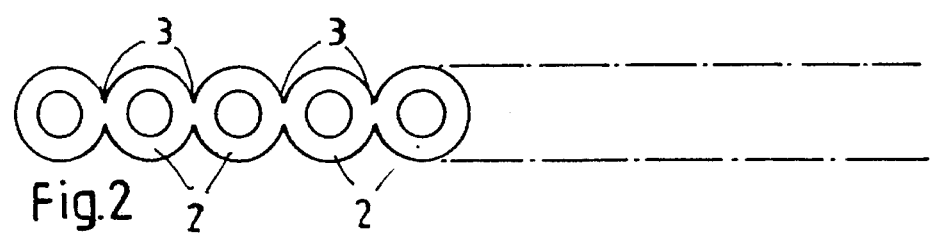
FIG. 2 represents a plan view of FIG. 1.
Figure 3:
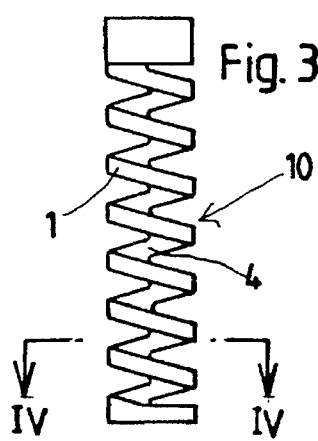
FIG. 3 represents a helical compression spring with continuous shaft
Figure 4:
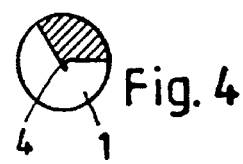
FIG. 4 represents a section along the line IV—IV in FIG. 3.

The helical compression spring 10 according to FIGS. 3 and 4 is designed around a continuous axial shaft 4 and consequently has a high stiffness in contrast to the coreless helical compression spring according to FIGS. 1 and 2.

Through the cross section of the shaft 4 or the diameter of the core passage, as well as the number of starts of the flight, the stiffness of the helical compression spring can be optimally adapted to the specific application.

Figure 5:
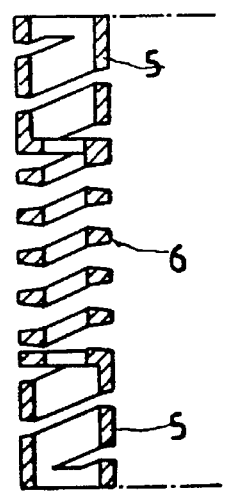
FIG. 5 represents a helical compression spring with varying pitch of the spring characteristic and FIG. 6 represents a modified spring characteristic.

FIG. 5 shows a helical compression spring with varying pitch of the spring characteristic. The end portions 5 of the helical compression spring have comparatively large cross section compared with the middle portion 6 with smaller cross section. The term "cross section" refers to the cross section of helical portions 5 and 6. This means, upon compression of the helical compression spring, firstly the comparatively soft middle portion 6 is compressed. Only thereafter do the hard end portions 5 come into action.

Figure 6:
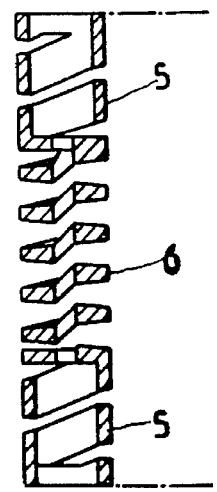

FIG. 6 shows a reverse form of the spring characteristic. The end portions 5 are comparatively soft owing to the smaller cross section, the middle portion 6 is hard owing to the larger cross section. Specifically, the upper and lower portions of the cross-section, as shown in FIG. 6 have a greater axial length, while the center portion has a greater axial width. This means that, upon compression of the helical compression spring, firstly the soft end portions 5 come into action. Only subsequently does the soft middle portion 6 come into action. This design is advantageous for a spring in a nonreturn valve, in order that the valve body reaches the closed position as quickly as possible upon the helical compression coming into action.

I claim:

1. A helical compression spring device, comprising:
    a plurality of helical compression springs with each helical compression spring having terminal rings at each of its two ends, with each said helical compression spring being made of plastic and formed by injection molding, said terminal rings each being coincident with a diameter of a flight of said helical compression spring, wherein said terminal rings of said plurality of said helical compression springs are arranged side-by-side and are materially interconnected by bridges to form a strip.

2. The helical compression spring device according to claim 1, wherein said helical compression spring has portions of differing spring stiffness in an axial direction.

3. The helical compression spring device according to claim 2, wherein said helical compression spring has a cross-section with upper and lower portions having a greater axial length, while a center portion of the flights has a greater axial width.

4. The helical compression spring device according to claim 1, wherein said plastic is a thermoplastic.

5. The helical compression spring device according to claim 1, wherein said plastic is an elastomer.

* * * * *